United States Patent
Yamada et al.

(10) Patent No.: US 6,473,542 B1
(45) Date of Patent: Oct. 29, 2002

(54) OPTICAL SWITCH AND OPTICAL DISK DRIVE

(75) Inventors: Masahiro Yamada, Kanagawa; Kiyoshi Osato, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/398,262

(22) Filed: Sep. 17, 1999

(30) Foreign Application Priority Data

Sep. 28, 1998 (JP) .......................................... 10-273918

(51) Int. Cl.⁷ ............................... G02B 6/42; G02F 1/29
(52) U.S. Cl. ............................... 385/16; 385/8; 359/315
(58) Field of Search ............................... 385/8, 16, 24, 385/40; 359/298, 315–16, 320

(56) References Cited

U.S. PATENT DOCUMENTS 5,732,177 A * 3/1998 Deacon et al. .............. 385/122

* cited by examiner

Primary Examiner—Hemang Sanghavi
Assistant Examiner—Jerry T Rahll
(74) Attorney, Agent, or Firm—Oblon, Spivak, McClelland, Maier & Neustadt, P.C.

(57) ABSTRACT

Disclosed herein is an optical switch including: a dielectric substrate having a pair of main surfaces opposed to each other; and a pair of electrodes formed on the main surfaces of the dielectric substrate; wherein a direction of emergence of a light beam propagating in the dielectric substrate is controlled according to an electric field applied from the electrodes to the dielectric substrate; the dielectric substrate being formed with a periodic structure of polarization inverted domains each having a given shape; the light beam being incident on domain walls of the polarization inverted domains; the electrode formed on at least one of the main surfaces being separated into at least first and second electrodes in a direction of propagation of the light beam.

10 Claims, 10 Drawing Sheets

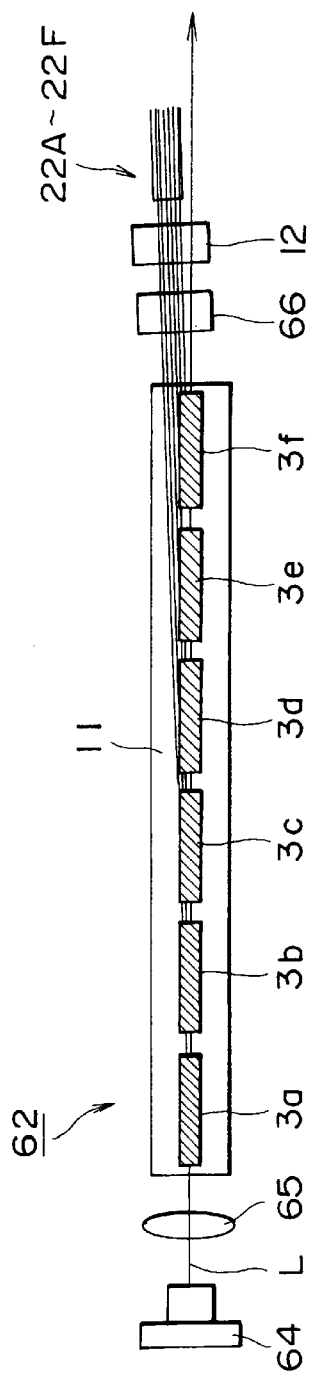
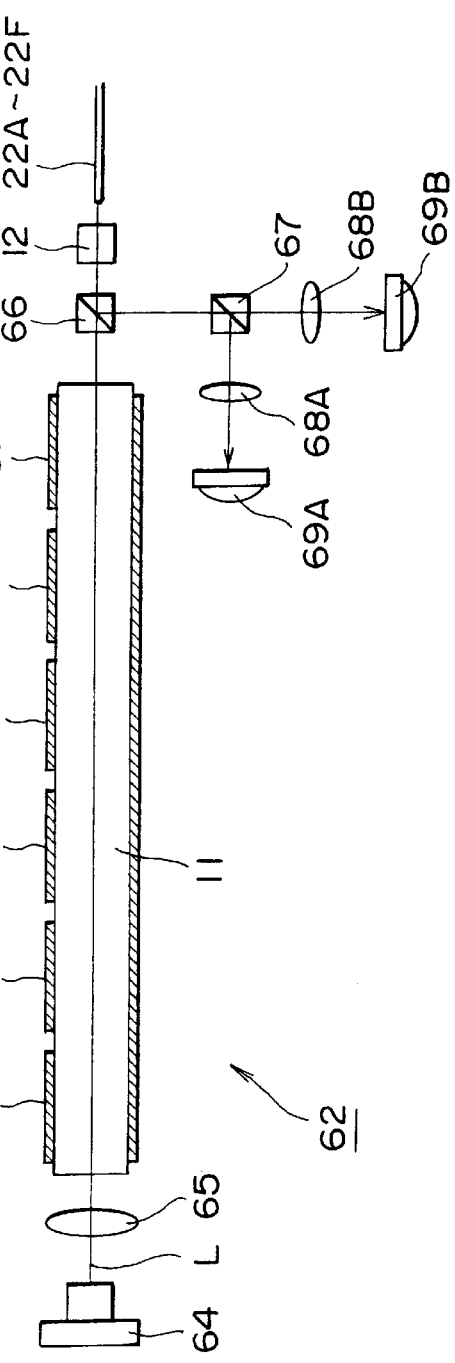
FIG. 8A
FIG. 8B

OPTICAL SWITCH AND OPTICAL DISK DRIVE

BACKGROUND OF THE INVENTION

The present invention relates generally to an optical switch, and more particularly to a compact, high-speed optical switch which can reduce insertion loss and crosstalk by forming a plurality of electrodes separated in the direction of propagation of a light beam on at least one of the main surfaces of a dielectric substrate having a periodic structure of polarization inverted domains. The present invention relates also to an optical disk drive using such an optical switch to selectively access a plurality of optical disks, for example.

In optical communication, an optical switch is used to switch the optical path of a light beam. The optical switch now in use is generally classified into a mechanical type and an electronic type.

The mechanical type optical switch is so designed as to mechanically switch the optical path of a light beam. Although the mechanical type optical switch has an advantage that the insertion loss and crosstalk are sufficiently small, the switching speed is as low as 1 to 100 msec. In contrast, the electronic type optical switch is so designed as to guide a light beam by means of a waveguide formed on a dielectric substrate, for example. Although the electronic type optical switch has an advantage that the switching speed is as high as 100 μsec to 10 nsec, the insertion loss is large and the crosstalk is −30 dB at the minimum.

In such an optical switch, it is desired both to reduce the insertion loss and crosstalk and to increase the switching speed. In this respect, the conventional mechanical type optical switch has a problem that the switching speed is low, and the conventional electronic type optical switch has a problem that the insertion loss and crosstalk are large.

In the case of switching a light beam to emerge it selectively from multiple outputs by using an optical switch having the conventional configuration, there is a problem that the configuration of the optical switch becomes large in size. As the electronic type optical switch, a bulk type optical switch is known. However, the switching speed of the bulk type optical switch is 1 to 100 μsec, which is lower than that of the other type optical switch using a waveguide.

SUMMARY OF THE INVENTION

It is accordingly an object of the present invention to provide a compact, high-speed optical switch which can reduce insertion loss and crosstalk.

It is another object of the present invention to provide an optical disk drive using the optical switch.

In accordance with an aspect of the present invention, there is provided an optical switch including a dielectric substrate having a pair of main surfaces opposed to each other; and a pair of electrodes formed on the main surfaces of the dielectric substrate; wherein a direction of emergence of a light beam propagating in the dielectric substrate is controlled according to an electric field applied from the electrodes to the dielectric substrate; the dielectric substrate being formed with a periodic structure of polarization inverted domains each having a given shape; the light beam being incident on domain walls of the polarization inverted domains; the electrode formed on at least one of the main surfaces being separated into at least first and second electrodes in a direction of propagation of the light beam.

In accordance with another aspect of the present invention, there is provided an optical disk drive including a laser light source for emitting a light beam; and an optical pickup for switching the optical path of the light beam emitted from the laser light source to supply the light beam selectively to a plurality of optical disks, thereby selectively accessing the plurality of optical disks, wherein the optical pickup is configured by using the above optical switch.

As described above, a periodic structure of polarization inverted domains each having a given shape is formed in the dielectric substrate, so that the light beam incident on the domain walls of the polarization inverted domains undergoes Bragg diffraction due to the periodic structure of polarization inverted domains to cause emergence of the light beam in a given direction or distribution of the light beam. Further, since the electrodes are formed on the main surfaces of the dielectric substrate, the direction of emergence of the light beam propagating in the dielectric substrate can be controlled according to an electric field applied from the electrodes to the dielectric substrate. Accordingly, it is possible to obtain an optical switch which can reduce insertion loss and crosstalk and can achieve a high switching speed. Further, the electrode formed on at least one of the main surfaces is separated into at least first and second electrodes in a direction of propagation of the light beam. Accordingly, it is possible to obtain a compact optical switch having multiple outputs corresponding to the first and second electrodes.

Other objects and features of the invention will be more fully understood from the following detailed description and appended claims when taken with the accompanying drawings.

BRIEF DESCRIPTION OF THE DRAWINGS

FIGS. 8A and 8B are a plan view and a side view of an optical pickup applied to the optical disk drive shown in FIG. 7, respectively;

Figure 2:
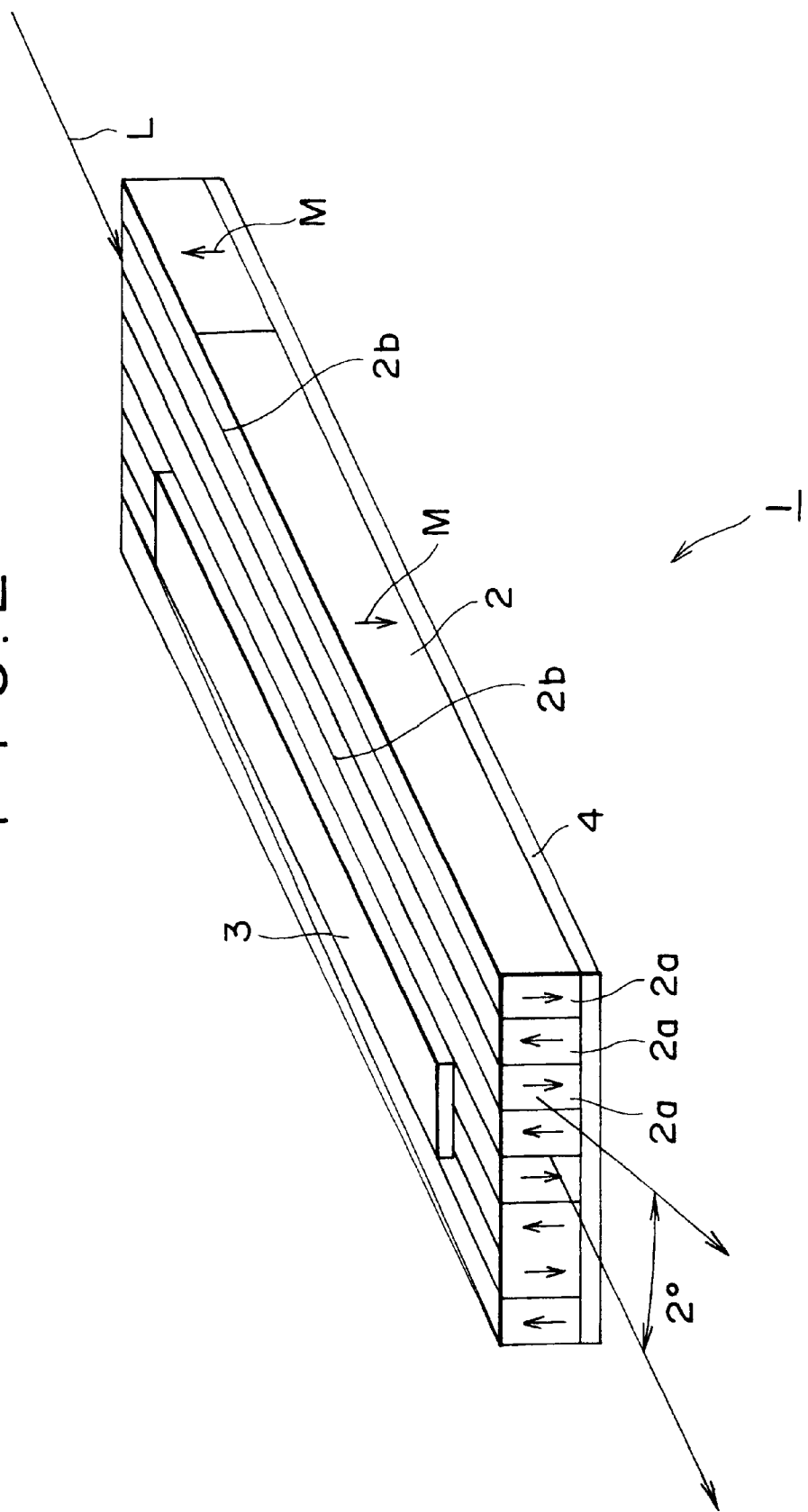
FIG. 2 is a perspective view for illustrating the principle of the optical switch shown in FIG. 1.

DETAILED DESCRIPTION OF THE PREFERRED EMBODIMENTS (1) First Preferred Embodiment Referring first to FIG. 2, there is shown an optical switch 1 in perspective according to a first preferred embodiment of the present invention to illustrate the principle of the optical switch 1. The optical switch 1 is composed mainly of a dielectric substrate 2 having an end surface on which a laser beam L emitted from a given laser light source (not shown) is incident. The optical switch 1 functions to switch the direction of emergence of the laser beam L from the other end surface of the dielectric substrate 2.

The dielectric substrate 2 has an elongated rectangular shape as viewed in plan. The laser beam L is substantially normally incident on the end surface of the dielectric substrate 2 to propagate in the dielectric substrate 2 along its length. The dielectric substrate 2 is formed from a ferroelectric crystal having an electrooptic effect. In the ferroelectric crystal, a periodic structure of plural polarization inverted domains 2a each having a given shape. In this preferred embodiment, lithium niobate ($LiNbO_3$) is adopted as the ferroelectric crystal.

The periodic structure of the polarization inverted domains 2a may be formed by locally applying an electric field to a lithium niobate crystal uniformly spontaneously polarized in one direction along the thickness of the dielectric substrate 2 to thereby locally produce spontaneous polarization of inverted polarity (M. Yamada and M. Saitoh, "Fabrication of a periodically inverted domain structure with a pitch of a few micrometers by applying an external electric field", J. Appl. Phys., 84, (1998)) (M. Yamada and K. Kishima, "Fabrication of a periodically reversed domain structure of SHG in $LiNbO_3$ by direct electron beam lithography at room temperature", Electron. Lett., 27, 828–829, (1991)). In FIG. 2, vertical arrows M show the directions of spontaneous polarization.

The dielectric substrate 2 has an optic axis parallel to its thickness direction. The polarization inverted domains 2a are formed so that the boundary (domain wall 2b) between any adjacent ones of the polarization inverted domains 2a forms a plane substantially perpendicular to a pair of upper and lower surfaces (which will be hereinafter referred to as main surfaces) of the dielectric substrate 2 opposed to each other in its thickness direction. The distance between the adjacent domain walls 2b is set to 20 μm, for example, and the polarization inversion of the polarization inverted domains 2a is periodically repeated. Further, each domain wall 2b is inclined a given angle with respect to each side surface of the dielectric substrate 2.

A pair of electrodes 3 and 4 of gold, for example, are formed on the opposed main surfaces of the dielectric substrate 2 by a thin-film forming method such as vapor deposition and sputtering. The electrode 4 is formed on the whole of one of the main surfaces of the substrate 2 (the lower surface of the substrate 2 as viewed in FIG. 2), and the electrode 3 is formed on a substantially central, rectangular portion of the other main surface of the substrate 2 (the upper surface of the substrate 2 as viewed in FIG. 2).

In the periodic structure of the polarization inverted domains 2a in the dielectric substrate 2, the refractive index of the dielectric substrate 2 is periodically changed according to the magnitude and direction of an electric field applied by the electrodes 3 and 4. This periodic change in the refractive index causes diffraction of the laser beam L passing through the dielectric substrate 2, thereby switching the direction of emergence of the laser beam L and also distributing the emergent laser beam L.

When an electric field is applied to a crystal having an electro-optic effect in a direction parallel to its optic axis (z axis), for example, the refractive index of the crystal changes in proportion to the strength of the applied electric field. Further, when the direction of the electric field applied to the crystal is inverted, the direction of the change in the refractive index is also inverted. Accordingly, as in the dielectric substrate 2 having a structure such that the direction of the crystal is periodically inverted by the polarization inverted domains 2a, the refractive index is periodically changed by the application of an electric field, resulting in diffraction of the laser beam L propagating in the dielectric substrate 2.

This diffraction is Bragg diffraction, and a medium having a periodically changing refractive index acts as a diffraction grating. The laser beam L propagating in this medium in a direction forming a Bragg angle with respect to a diffraction grating surface is diffracted in a direction forming an angle twice the Bragg angle. The Bragg angle is determined by the refractive index of the substrate and the period of change in the refractive index. In this preferred embodiment, the polarization inverted domains 2a are inclined with respect to each side surface of the substrate 2 so that the laser beam L is incident on each domain wall 2b at the Bragg angle. In the case that the distance between any adjacent ones of the domain walls 2b of the polarization inverted domains 2a formed in the lithium niobate substrate 2 as in this preferred embodiment is set to 20 μm, and that the laser beam L having a wavelength of 0.65 μm is incident on the substrate 2 with the polarization plane of the laser beam L set parallel to the optic axis (z axis) of the lithium niobate crystal, the Bragg angle is about 0.4°. Accordingly, the diffraction angle outside the device is about 0.2°.

In the optical switch 1, the emergent light is controlled according to the applied voltage between the electrodes 3 and 4, thereby allowing switching of the direction of emergence of the emergent light between two directions. Furthermore, the ratio between the light quantities in these two directions can be set to a desired value.

Figure 1:
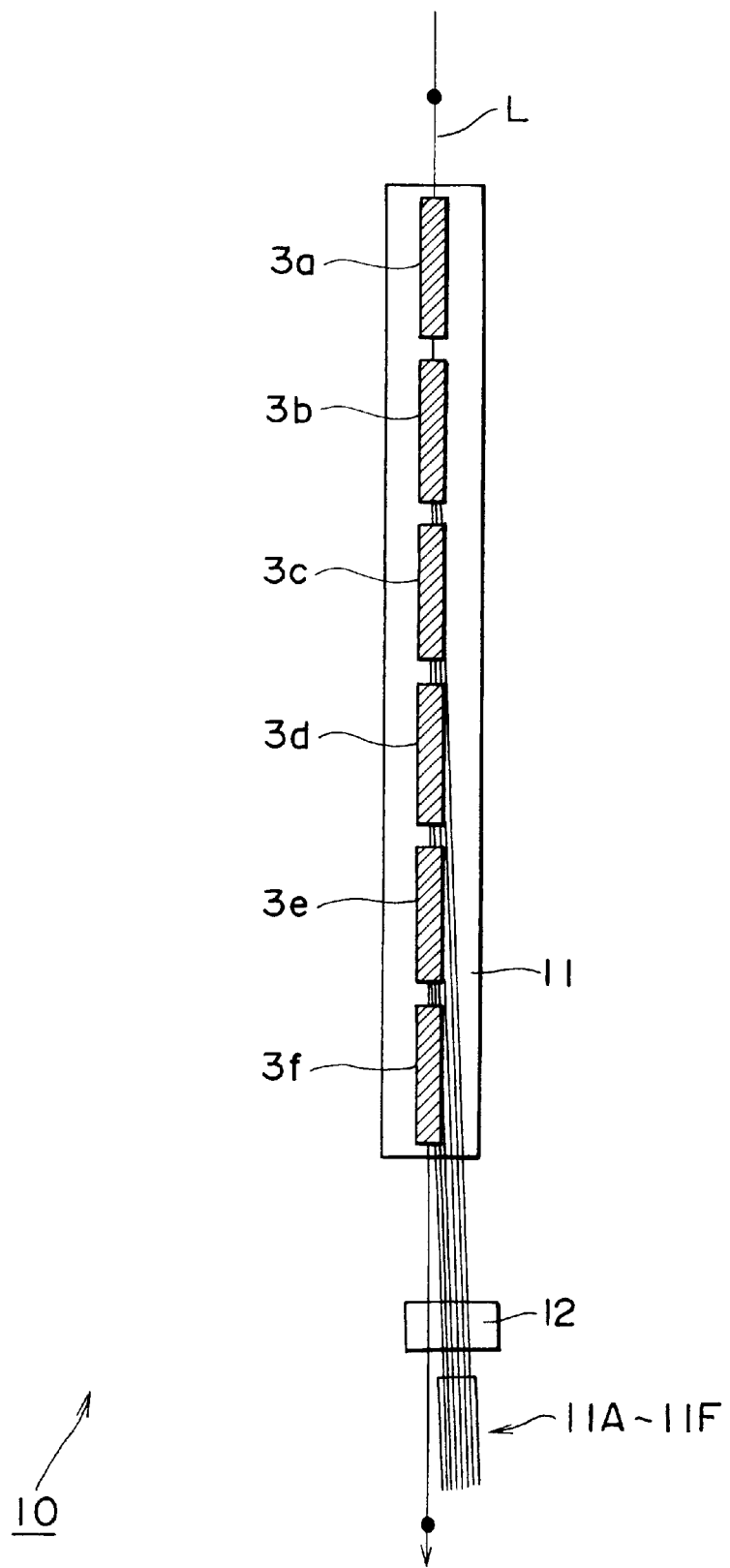
FIG. 1 is a plan view of an optical switch according to a first preferred embodiment of the present invention.

FIG. 1 is a plan view of an optical switch 10 according to the first preferred embodiment of the present invention. The optical switch 10 is formed by connecting six optical switches 1 as shown in FIG. 2 in series on a common dielectric substrate 11.

In the optical switch 10, the dielectric substrate 11 is formed from a lithium niobate crystal having a periodic structure of polarization inverted domains similar to that formed in the dielectric substrate 2 shown in FIG. 2. The dielectric substrate 11 has a pair of opposed main surfaces. An electrode 4 (see FIG. 2) is formed on the whole of one of the main surfaces of the substrate 11 (the lower surface of the substrate 11 as viewed in FIG. 1), and six rectangular electrodes 3a to 3f are formed on the other main surface of the substrate 11 (the upper surface of the substrate 11 as viewed in FIG. 1) so as to be arranged in series in the longitudinal direction of the dielectric substrate 11.

In the optical switch 10, the lithium niobate crystal has an optic axis (z axis) normal to the main surfaces, and a laser beam L of linearly polarized light having a polarization plane parallel to the optic axis of the substrate 11 is incident on one end surface of the substrate 11. When no voltage is applied to the electrodes 3a to 3f, the laser beam L propagates straight without diffraction under the electrodes 3a to 3f to outgo from the other end surface of the substrate 11.

In the optical switch 10, a given voltage is applied selectively to the electrodes 3a to 3f to thereby switch the direction of emergence of the laser beam L from the other end surface of the substrate 11 at the same angle (2° in this preferred embodiment) Accordingly, by selectively applying the given voltage to the electrodes 3a to 3f, any one of the six parallel optical paths spaced a given distance from each other is selected, and the laser beam L travels the selected optical path in emerging from the other end surface of the substrate 11.

In the optical switch 10, six optical fibers 11A to 11F are respectively arranged on these six parallel optical paths, and a microlens array 12 for introducing the laser beam L emerged from the dielectric substrate 11 to any corresponding one of the optical fibers 11A to 11F.

In operation, the laser beam L incident on one end surface of the dielectric substrate 11 propagates in the dielectric substrate 11 and is emerged from the other end surface of the dielectric substrate 11. In the case that no voltage is applied to the electrodes 3a to 3f, the laser beam L propagates straight without diffraction in the dielectric substrate 11 because the substrate 11 maintains its uniform refractive index, and is emerged from the other end surface of the substrate 11.

When a given voltage is applied to any one of the electrodes 3a to 3f, an electric field is generated between the electrode 4 and the selected one of the electrodes 3a to 3f to which the given voltage has been applied, so that the refractive index of the dielectric substrate 11 is changed. Since the dielectric substrate 11 has a periodic: structure of polarization inverted domains 2a (see FIG. 2), a periodically changed refractive index structure corresponding to the periodic structure of the polarization inverted domains 2a is formed in the substrate 11, so that the laser beam L propagating in the substrate 11 undergoes Bragg diffraction.

As a result, when the laser beam L propagates under the selected one of the electrodes 3a to 3f to which the given voltage has been applied, the direction of emergence of the laser beam L is changed by a given angle, and the laser beam L is emerged from the other end surface of the substrate 11 in this changed direction.

In general, this kind of dielectric material has optical anisotropy, so that the direction of emergence of the laser beam L subjected to Bragg diffraction differs according to the polarization plane of the laser beam L. In this preferred embodiment, however, the polarization plane of the laser beam L incident on the dielectric substrate 11 is parallel to the optic axis of the substrate 11, so that the laser beam L is emerged from the dielectric substrate 11 at a uniform angle.

In the dielectric substrate 11, a given voltage is applied selectively to the electrodes 3a to 3f. Since the electrodes 3a to 3f are arranged in series in the propagation direction of the laser beam L, the laser beam L emerging from the substrate 11 travels any one of the six optical paths corresponding to the selected one of the electrodes 3a to 3f to which the given voltage has been applied. Then, the laser beam L enters any one of the optical fibers 11A to 11F corresponding to the selected optical path through the microlens array 12.

In the case that the applied voltage to any one of the electrodes 3a to 3f is lower than the given voltage, the laser beam L is emerged in two directions, that is, in one direction determined by Bragg diffraction and in the other direction parallel to the longitudinal direction of the substrate 11. In this case, the light quantities in these two directions change according to the applied voltage. To the contrary, in the case that the applied voltage is equal to the given voltage, the laser beam L can be emerged in only one direction determined by Bragg diffraction with a sufficient suppression ratio.

Accordingly, the laser beam L can be made to enter any one of the optical fibers 11A to 11F with a sufficient suppression ratio by applying the given voltage to any corresponding one of the electrodes 3a to 3f. That is, crosstalk between the optical fibers 11A to 11F can be sufficiently suppressed.

Further, such a multi-output optical switch can be configured only by forming the electrodes 4 and 3a to 3f on the dielectric substrate 11 having a periodic structure of polarization inverted domains and arranging the microlens array 12 and the optical fibers 11A to 11F. Accordingly, it is possible to easily obtain a compact multi-output optical switch. Furthermore, the dielectric substrate 11 itself can be made compact, thereby facilitating size reduction of the optical switch.

Additionally, because the dielectric substrate 11 can be made compact, the loss of the laser beam L propagating in the dielectric substrate 11 can be accordingly reduced. Moreover, because the refractive index of the dielectric substrate 11 is changed by the application of a given voltage to switch the direction of emergence of the laser beam L, a switching speed can be increased.

According to the above configuration, the electrode formed on at least one of the opposed main surfaces of the dielectric substrate having a periodic structure of polarization inverted domains is composed of a plurality of electrodes 3a to 3f separated from each other in the direction of propagation of the laser beam L, thereby obtaining a compact, high-speed optical switch which can reduce insertion loss and crosstalk.

(2) Second Preferred Embodiment

Figure 3:
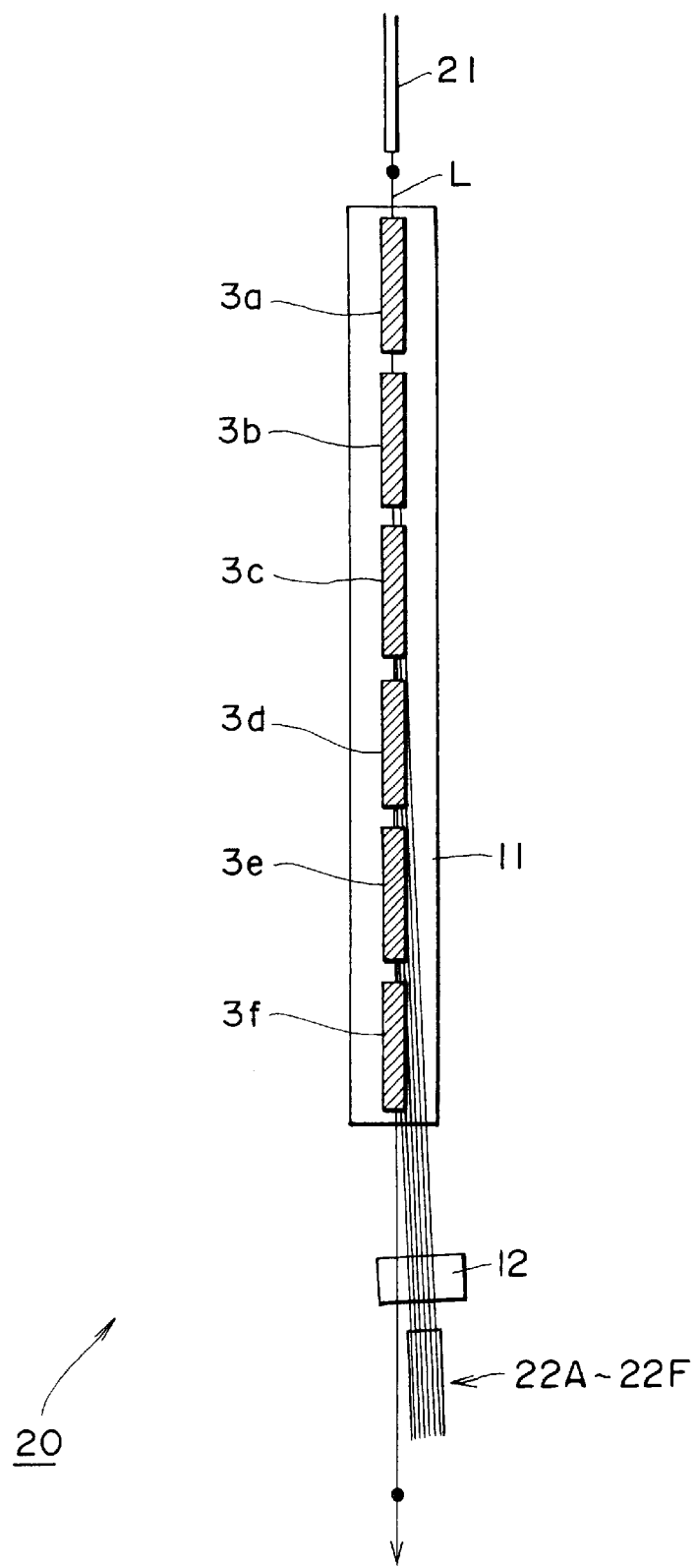
FIG. 3 is a plan view of an optical switch according to a second preferred embodiment of the present invention.

FIG. 3 is a plan view of an optical switch 20 according to a second preferred embodiment of the present invention. In FIG. 3, substantially the same parts as those shown in FIG. 1 are denoted by the same reference numerals, and the description thereof will be omitted to avoid repetition.

The optical switch 20 inputs a laser beam L from a polarization maintaining optical fiber 21 for transmitting incident light without changing its polarization plane. The polarization plane of the laser beam L is set parallel to the optic axis of a dielectric substrate 11.

The laser beam L is switched in its emergent direction by the dielectric substrate 11, and then enters any one of optical fibers 22A to 22F. Each of the optical fibers 22A to 22F is provided by a polarization maintaining optical fiber. Thus, in an optical system having the optical fibers 21 and 22A to 22F for transmitting the laser beam L, the laser beam L can be switched in this preferred embodiment.

With this configuration shown in FIG. 3, the laser beam L can be input and output through the polarization maintaining optical fibers 21 and 22A to 22F. Thus, in an optical system including the optical fibers 21 and 22A to 22F for transmitting the laser beam L, the laser beam L can be switched in its emergent direction, thereby obtaining an effect similar to that of the first preferred embodiment.

(3) Third Preferred Embodiment

Figure 4:
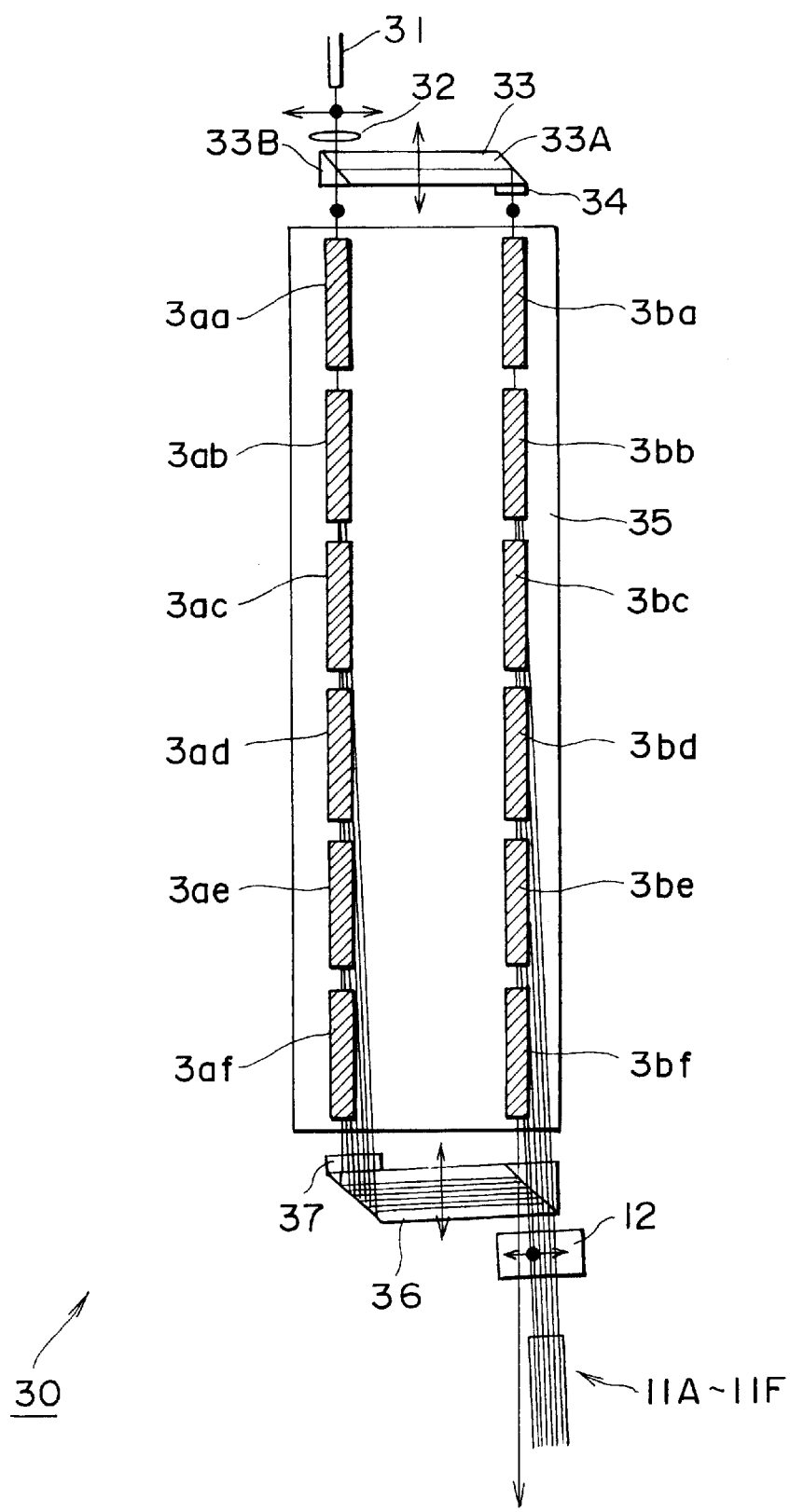
FIG. 4 is a plan view of an optical switch according to a third preferred embodiment of the present invention.

FIG. 4 is a plan view of an optical switch 30 according to a third preferred embodiment of the present invention. In FIG. 4, substantially the same parts as those shown in FIG. 1 are denoted by the same reference numerals, and the description thereof will be omitted to avoid repetition. In the optical switch 30, a laser beam having nonuniform polarization planes (e.g., a laser beam of circularly polarized light) is input through a normal optical fiber 31.

The laser beam from the optical fiber 31 is incident on a prism 33 through a convex lens 32. The prism 33 is composed of a parallelogrammatic prism 33A and a right-angled triangular prism 33B whose slant surface is attached to one of the slant surfaces of the prism 33A. The attached surfaces of the prisms 33A and 33B form a polarization beam splitter. The polarization beam splitter receives the laser beam from the optical fiber 31 through the convex lens 32 to separate the laser beam into a first component having a polarization plane parallel to the optic axis of a dielectric substrate 35 and a second component having a polarization plane perpendicular to the optic axis of the dielectric substrate 35. The first component is transmitted by the polarization beam splitter to directly enter the dielectric substrate 35. On the other hand, the second component is reflected by the polarization beam splitter to enter the other slant surface of the prism 33A. The second component is next reflected on the other slant surface of the prism 33A to pass through a half-wave plate 34. In the half-wave plate 34, the polarization plane of the second component is converted into a polarization plane parallel to the optic axis of the substrate 35.

By providing the prism 33 and the half-wave plate 34, the incident laser beam having nonuniform polarization planes. can be separated into two orthogonal polarization components, and the polarization planes of these two orthogonal polarization components can be next made parallel to the optic axis of the substrate 35 prior to incidence on the substrate 35.

The dielectric substrate 35 is wider than the dielectric substrate 11 shown in FIG. 1, and includes a periodic structure of polarization inverted domains as in the dielectric substrate 11. The dielectric substrate 35 has a pair of opposed main surfaces, in which an electrode is formed on the whole of one of the main surfaces (the lower surface as viewed in FIG. 4), and two parallel lines of electrodes 3aa to 3af and 3ba to 3bf are formed on the other main surface (the upper surface as viewed in FIG. 4). Each of the two parallel lines of the electrodes 3aa to 3af and 3ba to 3bf is the same in shape as the electrodes 3a to 3f shown in FIG. 1. The two parallel lines of the electrodes 3aa to 3af and 3ba to 3bf are arranged in such a manner that the first and second polarization components of the laser beam incident on the dielectric substrate 35 propagate under the two parallel lines of the electrodes 3aa to 3af and 3ba to 3bf, respectively.

In these two parallel lines of the electrodes 3aa to 3af and 3ba to 3bf formed on the dielectric substrate 35, the electrodes 3aa and 3ba are electrically connected to form a pair, the electrodes 3ab and 3bb are electrically connected to form a pair, the electrodes 3ac and 3bc are electrically connected to form a pair, the electrodes 3ad and 3bd are electrically connected to form a pair, the electrodes 3ae and 3be are electrically connected to form a pair, and the electrodes 3af and 3bf are electrically connected to form a pair. A given voltage is applied to any selected one of these pairs of the electrodes 3aa and 3ba, the electrodes 3ab and 3bb, the electrodes 3ac and 3bc, the electrodes 3ad and 3bd, the electrodes 3ae and 3be, and the electrodes 3af and 3bf. Accordingly, the dielectric substrate 35 switches the optical paths of the laser beams along the two parallel lines according to the application of the given voltage to any selected pair.

A prism 36 identical with the prism 33 is provided on the output side of the dielectric substrate 35. The two laser beams emerged from the dielectric substrate 35 are incident on the prism 36 and are combined by the prism 36. Prior to incidence of the two laser beams on the prism 36, one of the two laser beams is incident on a half-wave plate 37, by which the polarization plane of this incident laser beam is made orthogonal to the polarization plane of the other laser beam. Then, these two laser beams having orthogonal polarization planes are combined in the prism 36. Thus, the prism 36 reproduces the polarization planes of the laser beam incident on the optical switch 30. Thereafter, the laser beam is passed through a microlens array 12 to enter any corresponding one of the optical fibers 11A to 11F.

With this configuration shown in FIG. 4, the incident light is split into two components having orthogonal polarization planes, and these two components undergo switching in the dielectric substrate 35 having a periodic structure of polarization inverted domains. Then, these two components emerged from the dielectric substrate 35 are combined to be output from the optical switch 30. Thus, the incident light beam having various polarization planes can be switched in its emergent direction, thereby obtaining an effect similar to the effect of the first preferred embodiment.

(4) Fourth Preferred Embodiment

Figure 5:
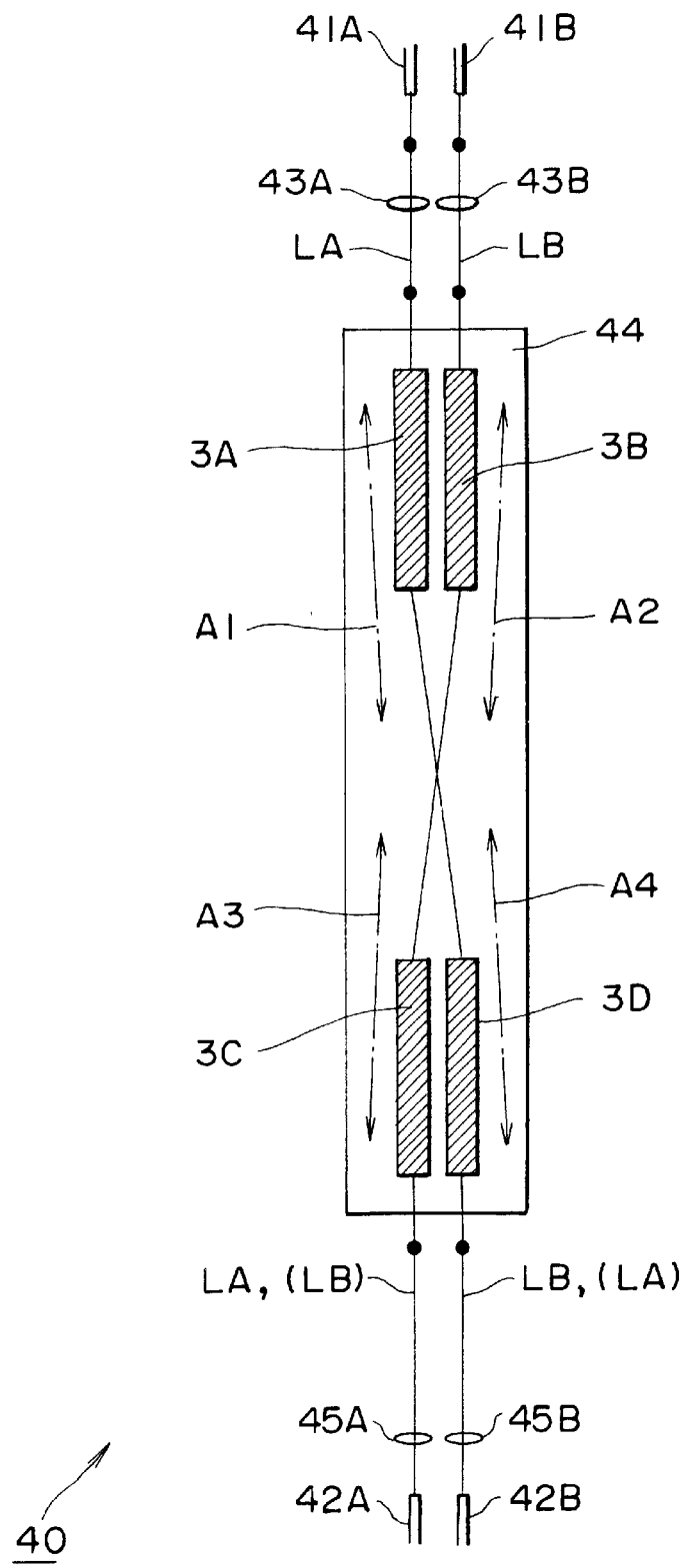
FIG. 5 is a plan view of an optical switch according to a fourth preferred embodiment of the present invention.

FIG. 5 is a plan view of an optical switch 40 according to a fourth preferred embodiment of the present invention. The optical switch 40 is a 2×2 optical switch, in which laser beams LA and LB of linearly polarized light input from a pair of optical fibers 41A and 41B undergo switching to be output to optical fibers 42A and 42B.

The laser beams LA and LB emerged from the optical fibers 41A and 41B are passed through convex lenses 43A and 43B, respectively, and are incident on one end surface of a dielectric substrate 44. Each of the optical fibers 41A and 41B is a polarization maintaining optical fiber for maintaining the polarization plane of each of the laser beams LA and LB parallel to the thickness direction of the dielectric substrate 44.

The dielectric substrate 44 has an elongated rectangular shape, and it is formed of a lithium niobate crystal having an optic axis extending along the thickness of the substrate 44. The dielectric substrate 44 has divided periodic structures each consisting of polarization inverted domains. That is, the dielectric substrate 44 is divided into four regions along the longitudinal center line and the lateral center line. Each region has a periodic structure of polarization inverted domains 2a. The periodic structures in the four regions are symmetrical with respect to the longitudinal center line and the lateral center line.

The domain walls in the two regions near the input end of the dielectric substrate 44 are set in orientation as shown by arrows A1 and A2 in FIG. 5 so that the propagation directions of the incident parallel laser beams LA and LB are intersected by applying a voltage. On the other hand, the domain walls in the two regions near the output end of the dielectric substrate 44 are set in orientation as shown by arrows A3 and A4 in FIG. 5 so that the propagation directions of the intersected laser beams LA and LB are returned to parallel directions.

More specifically, each periodic structure of polarization inverted domains is configured so that the distance between the adjacent domain walls is set to 3 μm. Accordingly, when the wavelength of each of the laser beams LA and LB is 0.65 μm, a diffraction angle of 5° can be ensured. Further, the angle formed between the optical axis of the laser beam LA and the orientation A1 of each domain wall near the input end is set to 2.5° the angle formed between the optical axis of the laser beam LB and the orientation A2 of each domain wall near the input end is set to −2.5°; the angle formed between the optical axis of the laser beam LA and the orientation A3 of each domain wall near the output end is set to −2.5°; and the angle formed between the optical axis of the laser beam LB and the orientation A4 of each domain wall near the output end is set to 2.5°.

An electrode is formed on the whole of the lower surface of the dielectric substrate 44, and four electrodes 3A to 3D are formed on the upper surface of the dielectric substrate 44 in the above-mentioned four regions, respectively. In the case that no voltage is applied to the electrodes 3A to 3D, the laser beams LA and LB incident on one end surface of the dielectric substrate 44 propagate straight in parallel to the longitudinal direction of the substrate 44, and are emerged from the other end surface of the substrate 44. In the case that a voltage is applied to all the electrodes 3A to 3D, the optical paths of the laser beams LA and LB are intersected to be reversed upon emergence from the other end surface of the substrate 44.

A pair of convex lenses 45A and 45B are placed on the optical paths of the laser beams LA and LB emerged from the dielectric substrate 44, thereby introducing the laser beams LA and LB into the optical fibers 42A and 42B. Each of the optical fibers 42A and 42B is a polarization maintaining optical fiber.

In operation, when no voltage is applied to the electrodes 3A to 3D, the laser beams LA and LB input from the optical fibers 41A and 41B are output to the optical fibers 42A and 42B, respectively, whereas when a voltage is applied to the electrodes 3A to 3D, the laser beams LA and LB input from the optical fibers 41A and 41B are output to the optical fibers 42B and 42A, respectively.

With the configuration shown in FIG. 5, a 2×2 optical switch capable of complementarily switching two systems of incident light is provided by using the dielectric substrate 44 having a periodic structure of polarization inverted domains. Also according to this preferred embodiment, it is possible to obtain a compact, high-speed optical switch which can reduce insertion loss and crosstalk.

(5) Fifth Preferred Embodiment

Figure 6:
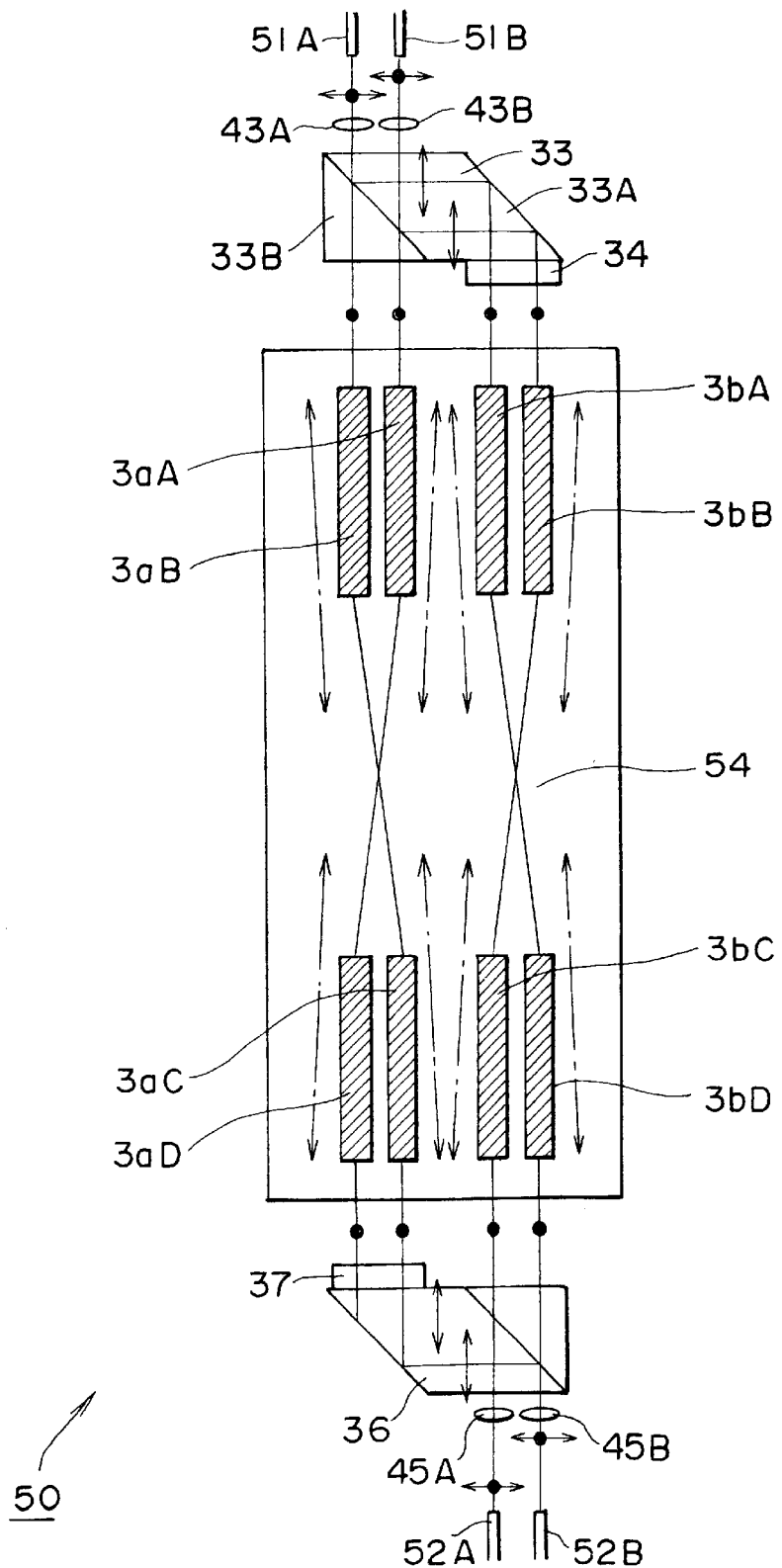
FIG. 6 is a plan view of an optical switch according to a fifth preferred embodiment of the present invention.

FIG. 6 is a plan view of an optical switch 50 according to a fifth preferred embodiment of the present invention. The optical switch 50 is a polarization-independent 2×2 optical switch, in which laser beams LA and LB input from a pair of optical fibers 51A and 51B are switched to be output to optical fibers 52A and 52B. In FIG. 6, substantially the same parts as those shown in FIGS. 4 and 5 are denoted by the same reference numerals, and the description thereof will be omitted to avoid repetition.

Each of the optical fibers 51A, 51B, 52A, and 52B is a normal optical fiber that does not maintain a polarization plane. The laser beams LA and LB input from the optical fibers 51A and 51B are passed through convex lenses 43A and 43B to enter a prism 33 described above with reference to FIG. 4. Each of the laser beams LA and LB is split into two orthogonal polarization components by the prism 33. One of the two orthogonal polarization components has a polarization plane parallel to the optic axis of a dielectric substrate 54, and it is transmitted by the prism 33 to enter the dielectric substrate 54. The other polarization component has a polarization plane perpendicular to the optic axis of the substrate 54, and it is reflected by the prism 33 to enter a half-wave plate 34, in which the polarization plane of the other polarization component is converted into a polarization plane parallel to the optic axis of the substrate 54. Thereafter, the other polarization component enters the substrate 54.

The dielectric substrate 54 is wider than the dielectric substrate 44 shown in FIG. 5, and it is configured by laterally arranging two systems of the domain structure and the electrode structure shown in FIG. 5. In each system, the laser beams LA and LB transmitted by the prism 33 are switched, and the laser beams LA and LB reflected by the prism 33 and passed through the half-wave plate 34 are switched.

Downstream of the output end of the dielectric substrate 54, a prism 36 and a half-wave plate 37 described above with reference to FIG. 4 are placed. Accordingly, the polarization planes of the laser beams LA in the two systems are returned to the original polarization planes, and the laser beams LA in the two systems are combined together. Similarly, the polarization planes of the laser beams LB in the two systems are returned to the original polarization planes, and the laser beams LB in the two systems are combined together. Thereafter, the laser beams LA and LB emerged from the prism 33 are passed through convex lenses 45A and 45B to enter the optical fibers 52A and 52B, respectively.

With the configuration shown in FIG. 6, in complementarily switching two systems of incident light by using the dielectric substrate 54 having a periodic structure of polarization inverted domains, each of the two systems of incident light is split into two orthogonal polarization components, and the polarization components having the same polarization plane in each system are subjected to switching. Thus, incident light beams each having nonuniform polarization planes can be switched to obtain an effect similar to the effect of the fourth preferred embodiment.

(6) Sixth Preferred Embodiment

Figure 7:
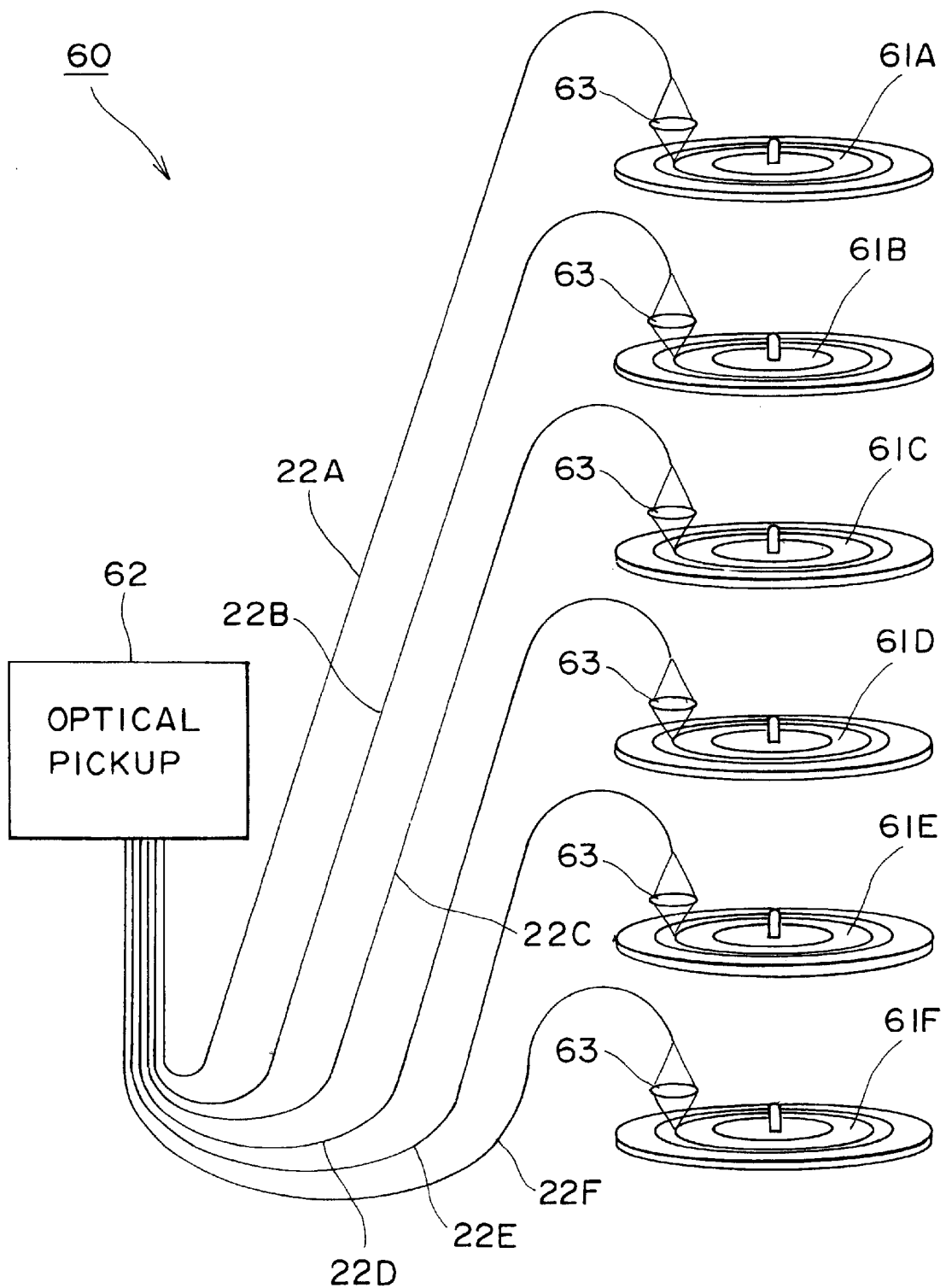
FIG. 7 is a schematic diagram of an optical disk drive according to a sixth preferred embodiment of the present invention.

FIG. 7 is a schematic diagram of an optical disk drive 60 according to a sixth preferred embodiment of the present invention. The optical disk drive 60 has an optical pickup 62 for selectively accessing six magneto-optical disks 61A to 61F.

The magneto-optical disks 61A to 61F are rotationally driven by a spindle motor (not shown). A laser beam emerged from the optical pickup 62 through a selected one of optical fibers 22A to 22F is directed onto a corresponding one of the magneto-optical disks 61A to 61F. An objective lens 63 and a modulating coil (not shown) are placed near a front end of each of the optical fibers 22A and 22F. Accordingly, desired data can be recorded on the selected one of the magneto-optical disks 61A to 61F by thermomagnetic recording. The laser beam is reflected on the selected one of the magneto-optical disks 61A to 61F, and focused by the corresponding objective lens 63 to enter the corresponding one of the optical fibers 22A to 22F. Thus, the reflected light as return light from the selected one of the magneto-optical disks 61A to 61F is transmitted through the corresponding one of the optical fibers 22A to 22F to the optical pickup 62.

FIGS. 8A and 8B are a plan view and a side view of the optical pickup 62, respectively. The optical pickup 62 employs the optical switch 20 shown in FIG. 3. In FIGS. 8A and 8B, substantially the same parts as those shown in FIG. 3 are denoted by the same reference numerals, and the description thereof will be omitted to avoid repetition.

A laser diode 64 is provided to emit a laser beam having a polarization plane parallel to the thickness direction of the dielectric substrate 11. The laser beam emitted from the laser diode 64 is passed through a convex lens 65 to enter one end surface of the dielectric substrate 11. In recording data, the light quantity of the laser beam is raised from that in reproducing data with a fixed period. In reproducing data, the light quantity of the laser beam is set to a fixed quantity.

By applying a voltage selectively to the electrodes 3a to 3f, the laser beam emerged from the other end surface of the dielectric substrate 11 can be input selectively to the optical fibers 22A to 22F. Further, the return light reflected selectively from the magneto-optical disks 61A to 61F is input selectively from the optical fibers 22A to 22F.

A polarization beam splitter 66 is interposed between the dielectric substrate 11 and the microlens array 12. The laser beam emerged from the dielectric substrate 11 is transmitted by the polarization beam splitter 66 to enter the microlens array 12. On the other hand, the return light from the microlens array 12 is reflected by the polarization beam splitter 66 in such a manner that the optical path of the return light is bent 90°. Thus, the optical path of the laser beam emerged from the dielectric substrate 11 and the optical path of the return light are separated from each other.

Further, a polarization beam splitter 67 is placed on the optical path of the return light reflected 90° as mentioned above, so as to split the return light into two components whose light quantities vary complementarily according to the polarization plane of the return light.

Two convex lenses 68A and 68B are provided to respectively focus the two components emerged from the polarization beam splitter 67. Two photodetectors 69A and 69B are provided to respectively detect the two components emerged from the convex lenses 68A and 68B. Each of the photodetectors 69A and 69B outputs a detection result whose signal level varies with the light quantity of the incident polarization component.

A differential signal between the output signals from the photodetectors 69A and 69B is generated to be processed, thereby reproducing data recorded on a selected one of the magneto-optical disks 61A to 61F by utilizing a magnetic Kerr effect.

With the configuration shown in FIG. 7 and FIGS. 8A and 8B, an optical disk drive capable of selectively accessing a desired magneto-optical disk by using a compact, high-speed optical switch which can reduce insertion loss and crosstalk.

(7) Seventh Preferred Embodiment

Figure 9:
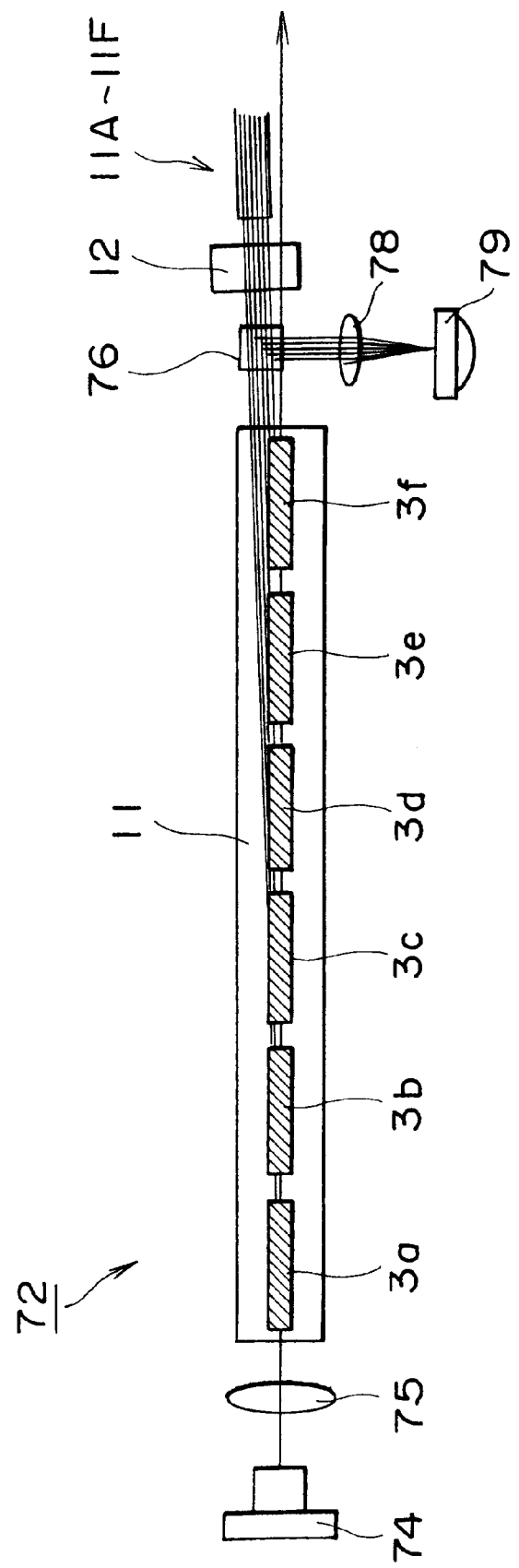
FIG. 9 is a plan view of an optical pickup applied to an optical disk drive according to a seventh preferred embodiment of the present invention.

FIG. 9 is a plan view of an optical pickup 72 applied to an optical disk drive (not shown) according to a seventh preferred embodiment of the present invention. Like the optical disk drive 60 shown in FIG. 7, the optical disk drive according to this preferred embodiment is capable of selectively accessing six optical disks by means of the optical pickup 72. Each of these six optical disks is a phase-change type optical disk or a read-only optical disk on which desired data has already been recorded by pits.

The optical pickup 72 employs the optical switch 10 shown in FIG. 1. In FIG. 9, substantially the same parts as those shown in FIG. 1 are denoted by the same reference numerals, and the description thereof will be omitted to avoid repetition.

A laser diode 74 is provided to emit a laser beam. The laser beam emitted from the laser beam 74 is passed through a convex lens 75 to enter one end surface of the dielectric substrate 11. In recording data onto a phase-change type optical disk, the light quantity of the laser beam is raised from that in reproducing data, according to the data to be recorded. In reproducing data recorded on a phase-change type optical disk or on a read-only optical disk, the light quantity of the laser beam is lowered to a fixed quantity.

By applying a voltage selectively to the electrodes 3a to 3f, the laser beam emerged from the other end surface of the dielectric substrate 11 can be input selectively to the optical fibers 11A to 11F.

Like the configuration shown in FIG. 7, the optical fibers 11A to 11F respectively extend toward the six optical disks designed to rotate at a given speed. The laser beam transmitted selectively by the optical fibers 11A to 11F is emerged from the front end of the selected optical fiber, and is focused by an objective lens onto the corresponding optical disk. The resultant return light reflected on the optical disk is transmitted selectively through the optical fibers 11A to 11F to the optical pickup 72.

A beam splitter 76 is interposed between the dielectric substrate 11 and the microlens array 12. The laser beam emerged from the dielectric substrate 11 is transmitted by the beam splitter 76 to the microlens array 12. On the other hand, the return light from the microlens array 12 is reflected by the beam splitter 76 in such a manner that the optical path of the return light is bent 90°. Thus, the optical path of the laser beam emerged from the dielectric substrate 11 and the optical path of the return light are separated from each other.

A convex lens 78 and a photodetector 79 are placed on the optical path of the return light reflected 90° as mentioned above. Then, a detection result from the photodetector 79 is processed to thereby reproduce data recorded on the desired optical disk.

With the configuration shown in FIG. 9, an optical disk drive capable of selectively accessing a desired phase-change type optical disk or read-only optical disk by using a compact, high-speed optical switch which can reduce insertion loss and crosstalk.

(8) Eighth Preferred Embodiment

Figure 10:
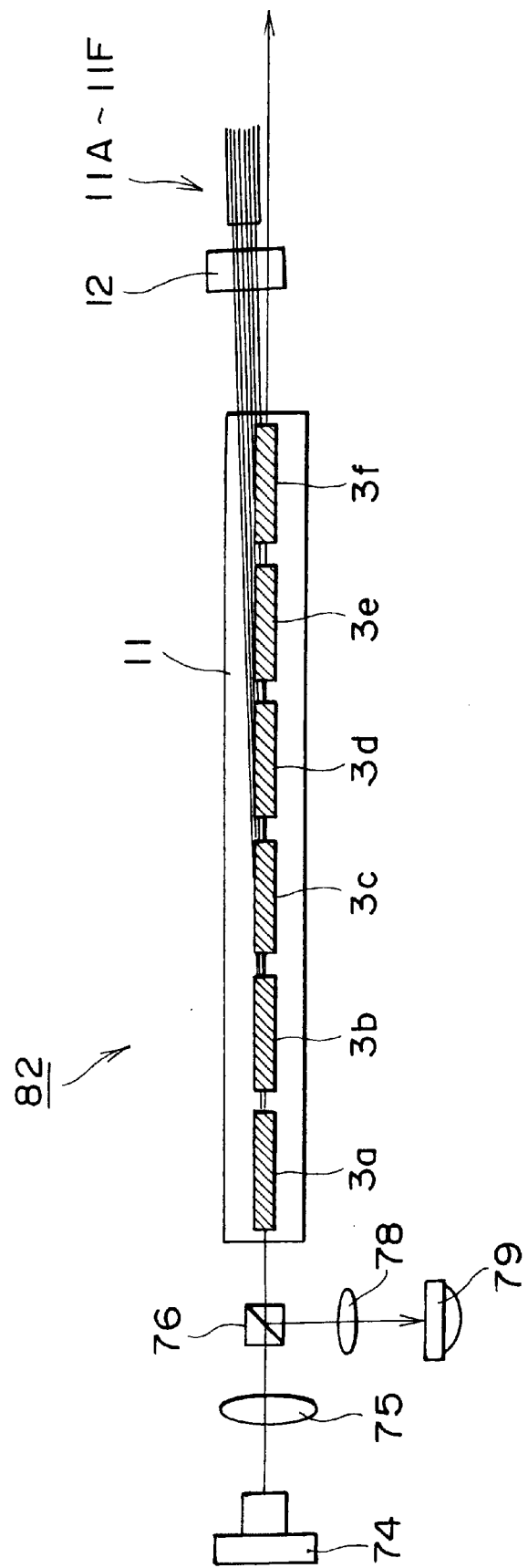
FIG. 10 is a plan view of an optical pickup applied to an optical disk drive according to an eighth preferred embodiment of the present invention.

FIG. 10 is a plan view of an optical pickup 82 applied to an optical disk drive (not shown) according to an eighth preferred embodiment of the present invention. This optical disk drive employs the optical pickup 82 in place of the optical pickup 72 shown in FIG. 9. In FIG. 10, substantially the same parts as those shown in FIG. 9 are denoted by the same reference numerals, and the description thereof will be omitted to avoid repetition.

The optical pickup 82 is similar to the optical pickup 72 shown in FIG. 9 except that the photodetecting optical system including the beam splitter 76, the convex lens 78, and the photodetector 79 is interposed between the convex lens 75 and the dielectric substrate 11.

Also in this preferred embodiment wherein the photodetecting optical system is placed near the incident end surface of the dielectric substrate 11 as shown in FIG. 10, an effect similar to the effect of the seventh preferred embodiment can be obtained.

(9) Other Preferred Embodiments

While the present invention is applied to a one-input six-output optical switch and a 2×2 optical switch in the above preferred embodiments, the present invention is not limited to these configurations, but it is widely applicable to a multi-output optical switch and a multi-input multi-output optical switch.

While the polarization plane of the laser beam incident on the dielectric substrate is set parallel to the optic axis of the dielectric substrate along the thickness thereof in the above preferred embodiments, the present invention is not limited to this configuration, but the polarization plane of the incident laser beam may be set perpendicular to the optic axis of the dielectric substrate. In this case, however, attention must be paid to the fact that the diffraction angle is different from that mentioned in the above preferred embodiments.

While a lithium niobate substrate is used as the dielectric substrate in the above preferred embodiments, the present invention is not limited to this configuration, but any other ferroelectric substrates such as a lithium tantalate substrate may be widely used.

While the laser beam incident on the dielectric substrate propagates directly through the substrate in the above preferred embodiments, the present invention is not limited to this configuration, but the dielectric substrate may be formed with a waveguide for guiding the laser beam during propagation in the substrate.

While an electrode is formed on the whole of the lower surface of the dielectric substrate in the above preferred embodiments, the present invention is not limited to this configuration, but a plurality of electrodes may be formed on the lower surface of the substrate so as to correspond to the electrodes formed on the upper surface of the substrate.

While the present invention is applied to an optical switch configured to switch a laser beam in the above preferred embodiments, the present invention is not limited to this configuration, but it is widely applicable to an optical switch configured to separate a laser beam into a plurality of luminous fluxes and to make the ratio in light quantity between these luminous fluxes variable. In this case, the ratio in light quantity can be controlled according to the applied voltage to each electrode.

According to the present invention as described above, it is possible to obtain a compact, high-speed optical switch which can reduce insertion loss and crosstalk, by forming a plurality of electrodes separated in the direction of propagation of a light beam on at least one of the main surfaces of a dielectric substrate having a periodic structure of polarization inverted domains. It is also possible to obtain an optical disk drive including such an optical switch.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An optical switch comprising:
    a dielectric substrate having a pair of main surfaces opposed to each other and having an input face and an output face, a light beam propagating through said dielectric substrate from said input face to said output face; and
    a pair of electrodes formed on said main surfaces of said dielectric substrate;
    said dielectric substrate being formed with a periodic structure of polarization inverted domains each having a given shape;
    said light beam being incident on domain walls of said polarization inverted domains;
    said electrode formed on at least one of said main surfaces being separated into at least first and second electrodes in a direction of propagation of said light beam,
    wherein an electric field applied from said electrodes to said dielectric substrate controls an amount of diffraction of said light beam propagating through said dielectric substrate, and thereby controls a direction of emergence of light output from said output face of said dielectric substrate.

2. An optical switch according to claim 1, further comprising an optical waveguide formed on at least one of said main surfaces for guiding said light beam.

3. An optical switch according to claim 2, further comprising:
    first and second optical fibers provided so as to respectively correspond to said first and second electrodes, for selectively transmitting said light beam emerged from said dielectric substrate; and
    a lens for introducing said light beam to one of said first and second optical fibers.

4. An optical switch according to claim 3, wherein each of said first and second optical fibers comprises an optical fiber capable of maintaining the polarization plane of incident light.

5. An optical switch according to claim 1, further comprising:
    first and second optical fibers provided so as to respectively correspond to said first and second electrodes, for selectively transmitting said light beam emerged from said dielectric substrate; and
    a lens for introducing said light beam to one of said first and second optical fibers.

6. An optical switch according to claim 5, wherein each of said first and second optical fibers comprises an optical fiber capable of maintaining the polarization plane of incident light.

7. An optical switch comprising:
    a dielectric substrate having a pair of main surfaces opposed to each other;
    a pair of electrodes formed on said main surfaces of said dielectric substrate;
    wherein a direction of emergence of a light beam propagating in said dielectric substrate is controlled according to an electric field applied from said electrodes to said dielectric substrate;
    said dielectric substrate being formed with a periodic structure of polarization inverted domains each having a given shape;
    said light beam being incident on domain walls of said polarization inverted domains;
    said electrode formed on at least one of said main surfaces being separated into at least first and second electrodes in a direction of propagation of said light beam, and further comprising:
    first and second optical fibers provided so as to respectively correspond to said first and second electrodes, for selectively transmitting said light beam emerged from said dielectric substrate; and
    a lens for introducing said light beam to one of said first and second optical fibers.

8. An optical switch according to claim 7, further comprising an optical waveguide formed on at least one of said main surfaces for guiding said light beam.

9. An optical switch according to claim 7, wherein each of said first and second optical fibers comprises an optical fiber capable of maintaining the polarization plane of incident light.

10. An optical switch according to claim 8, wherein each of said first and second optical fibers comprises an optical fiber capable of maintaining the polarization plane of incident light.

* * * * *